April 3, 1956 W. L. HARDEN 2,740,219
FISHING ROD HOLDER
Filed June 19, 1953
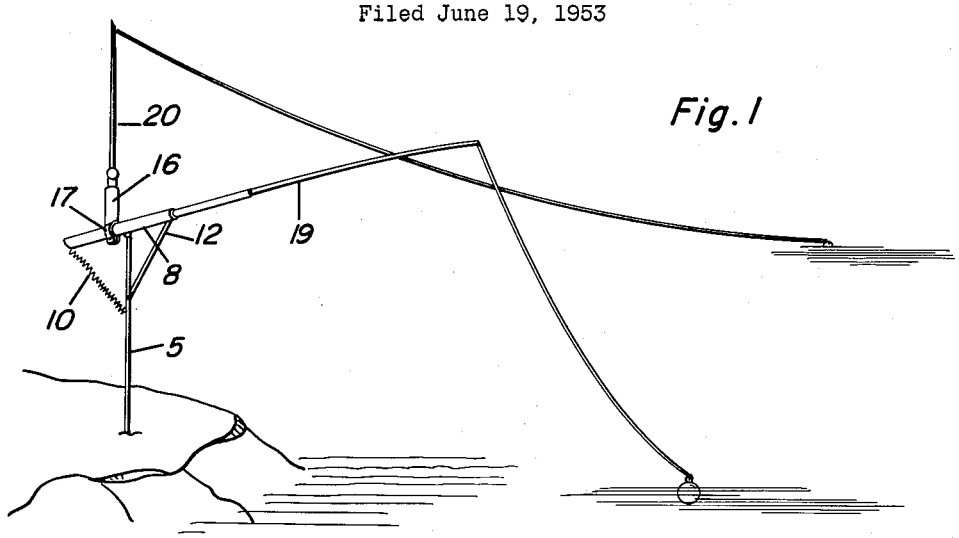
Fig. 1
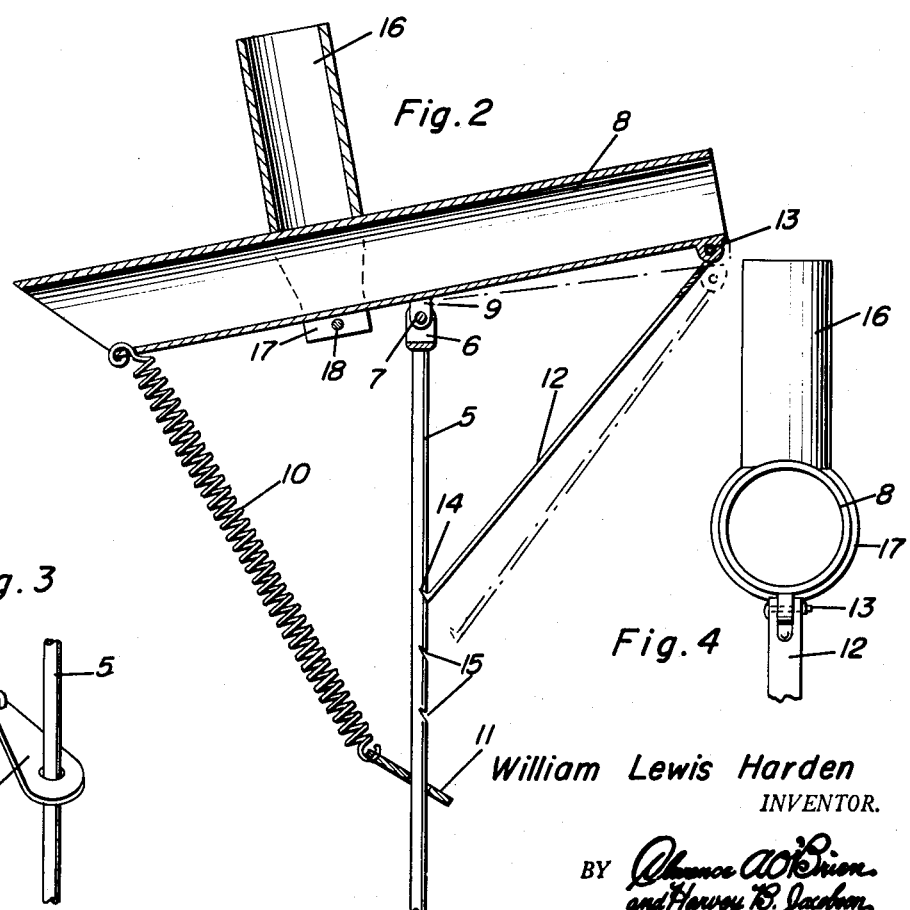
Fig. 2
Fig. 3
Fig. 4
William Lewis Harden
INVENTOR.
BY *Clarence A. O'Brien*
*and Harvey B. Jackson*
Attorneys United States Patent Office 2,740,219
Patented Apr. 3, 1956

2,740,219

FISHING ROD HOLDER

William Lewis Harden, Llano, Tex.

Application June 19, 1953, Serial No. 362,801

3 Claims. (Cl. 43—16)

The present invention relates to new and useful improvements in holders for fishing rods for use in supporting a rod on the bank of a stream.

An important object of the invention is to provide a pivoted spring actuated rod holder to swing the rod upwardly and having an automatically released catch which locks the holder inactive and is released by the action of a fish pulling on the line to set the fish hook.

Another object is to provide a socket clamped to the rod holder to provide an auxiliary holder for a second fishing rod.

A further object is to provide a device of this character of simple and practical construction, which is efficient and reliable in operation, strong and durable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the device;

Figure 2 is a longitudinal sectional view through the device of Fig. 1;

Figure 3 is a fragmentary perspective view of the spring tension adjusting means; and, Figure 4 is an enlarged fragmentary front elevational view.

Referring now to the drawing in detail, wherein for the purpose of illustration I have disclosed a preferred embodiment of my invention, the numeral 5 designates a metal stake having a bifurcated upper end 6 provided with a transverse pin 7 on which a tubular rod holder 8 is pivoted by means of an apertured ear 9 on the underside of the holder substantially at the central portion of the latter.

A coil spring 10 is secured at one end to the rear end of holder 8 and the spring extends downwardly therefrom and is attached at its lower end to a friction gripping apertured plate or washer 11 slidably mounted on the stake 5 and retained in vertically adjusted position thereon by inclining or canting the plate to adjust the tension of spring 10.

A catch rod or hook 12 is pivotally attached at one end on a pin 13 at the lower front portion of holder 8 and extends downwardly therefrom and is formed at its lower end with a tapered upwardly inclined prong 14 selectively engaged in a row of upwardly inclined vertically spaced apart notches 15 in one side of the stake to hold the front end of holder 8 downwardly against the tension of spring 10.

A socket 16 forms an auxiliary tubular fishing rod holder and is formed at one end with a split clamp 17 embracing the holder 8 and secured in an upstanding longitudinally adjusted position on the latter by a bolt and nut 18.

In the operation of the device, a fishing pole 19 is placed in the front end of holder 8 and a second fishing pole 20 may also be placed in socket 16 and holder 8 is locked in a lower inclined position by catch rod 12 engaged in one of the notches 15. When a fish strikes the line of either fishing pole the downward pulling force subjected thereto will release catch 12 and spring 10 will then swing holder 8 upwardly and swing socket 16 rearwardly to set the fish hook in the fish.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fishing rod holder comprising a support, a tubular member pivotally attached at one side to the support for vertical swinging movement, spring means engaging said member to swing the same upwardly, catch means holding the member downwardly, a second tubular member, and a split clamping ring projecting longitudinally at one end of said last named member and securing the latter in longitudinally adjusted angularly disposed position on said first named member.

2. A fishing rod holder comprising a vertical supporting rod, a tubular member pivotally connected at an intermediate portion to the upper end of said rod for vertical swinging movement of the tubular member, spring means connecting one end of the tubular member to the rod for swinging the other end thereof upwardly, said rod having a notch therein, and a catch rod pivoted at one end to the other end of said tubular member and said catch rod having a hook at its free end releasably engaged in said notch to lock the tubular member inactive against the tension of the spring and said catch rod being released upon a downward movement of the end of the tubular member connected to the catch rod.

3. The construction of claim 2 and including a second tubular member supported in an upstanding position on said first-named tubular member and each of said tubular members being adapted for receiving the butt of a fishing rod for jerking the fishing lines of both fishing rods upon release of the catch rod.

References Cited in the file of this patent

UNITED STATES PATENTS

| | | |
|---|---|---|
| 922,338 | Root | May 18, 1909 |
| 992,070 | Schope | May 9, 1911 |
| 1,653,083 | Blaw | Dec. 20, 1927 |
| 2,055,842 | Haislip | Sept. 29, 1936 |
| 2,184,192 | McCline et al. | Dec. 19, 1939 |
| 2,448,752 | Wagner | Sept. 7, 1948 |
| 2,460,568 | Buehner | Feb. 1, 1949 |
| 2,548,351 | Coombs | Apr. 10, 1951 |
| 2,551,996 | Cherubini | May 8, 1951 |
| 2,642,690 | Soenksen | June 23, 1953 |

FOREIGN PATENTS

| | | |
|---|---|---|
| 7,759 | Great Britain | 1893 |